US005887169A

United States Patent [19]
Lacombe

[11] Patent Number: 5,887,169
[45] Date of Patent: Mar. 23, 1999

[54] METHOD AND APPARATUS FOR PROVIDING DYNAMIC ENTRY POINTS INTO A SOFTWARE LAYER

[75] Inventor: John Steven Lacombe, Tomball, Tex.

[73] Assignee: Compaq Computer Corporation, Houston, Tex.

[21] Appl. No.: 816,321

[22] Filed: Mar. 15, 1996

[51] Int. Cl.⁶ ........................................................ G06F 9/00
[52] U.S. Cl. .............................................................. 395/681
[58] Field of Search ...................................... 395/681, 685

[56] References Cited

U.S. PATENT DOCUMENTS

| 5,325,532 | 6/1994 | Crosswy et al. | 395/652 |
|---|---|---|---|
| 5,691,897 | 11/1997 | Brown et al. | 364/167.02 |

OTHER PUBLICATIONS (no author given), "Real–Time Systems and Microsoft Windows NT", Microsoft Corporation, Microsoft Developer's CD–ROM, Jun. 1995.

(no author given), "Apple's New Operating System: System 8.0 offers up-to-date OS services, such as limited preemptive multitasking, concurrent I/O, and memory protection", BYTE; p. 59; vol. 20, No. 6, Jun. 1995.

Asche, Ruediger, R., "The Little Device Driver Writer", Microsoft Developer's CD–ROM, p.(26), Feb. 1994.

Goodman, Kevin, J., "Windows NT: A Developers Guide", (see Support for Different Architectures), M&T books, p. (2), 1994.

Rehm, Eric, "Writing User–Mode Windows NT Drivers for Alpha AXP Platforms", MSDN CD ROM Library, p. (25), Jun. 1994.

Thompson, Tom, "Copland: The Abstract Mac OS", BYTE, p. (3), Jul. 1995.

"Windows NT Resource Kit," Windows NT Resource Guide, Microsoft Press 1995, pp. 1–30 and 173–175.

*Primary Examiner*—Alvin Oberley
*Assistant Examiner*—St. John Courtenay, III
*Attorney, Agent, or Firm*—Beyer & Weaver, LLP

[57] ABSTRACT

A technique for enhancing a software layer while ensuring backwards compatibility is disclosed. In one implementation, the software layer is a hardware abstraction layer (HAL) that interfaces between hardware and an operating system of a computer system. The HAL can be enhanced with additional functionality without having to worry about crashing the operating system when the particular HAL in use with the computer system lacks the additional functionality. Hence, the inventive technique allows enhancements to the HAL to be made without causing any backwards compatible problems.

18 Claims, 9 Drawing Sheets

METHOD AND APPARATUS FOR PROVIDING DYNAMIC ENTRY POINTS INTO A SOFTWARE LAYER

BACKGROUND OF THE INVENTION

1. Field of the Invention

The present invention relates to an operating system and, more particularly, to an operating system in which hardware dependencies are transparent to most parts of the operating system.

2. Description of the Related Art

FIG. 1 is a block diagram of the architecture of Microsoft® Windows NT™ operating system 100. The Windows NT operating system 100 is a modular operating system composed of layers. The Window NT operating system 100 includes an executive services system 102 which interacts with hardware 104 associated with a computer system on which the Windows NT operating system 100 executes. The executive services system 102 includes a hardware abstraction layer (HAL) 106, a kernel 108, and a set of services 110–120. The environment subsystems (not shown) which interact with the Windows NT operating system 100 can use any of the services 110–120.

Between the services 110–120 of the Windows NT operating system 100 and the hardware 104 is the HAL 106. Although the kernel 108 and the executive services system 102 could also directly interact with the hardware 104, the primary interaction with the hardware 104 by the Windows NT operating system 100 is through the HAL 106. The HAL 106 is a layer of software provided by the hardware manufacturer that hides (or abstracts) hardware differences from higher layers of the Windows NT operating system 100. As a result, different types of hardware all look alike to an operating system. Hence, it is not necessary to specifically tailor an operating system to the hardware with which it communicates.

The HAL 106 contains routines (function calls) that allow a single device driver to support the same device on numerous hardware platforms. The routines within the HAL 106 are typically called from either the base operating system (e.g., the kernel 108) or from device drivers residing within the I/O Manager 110. Accordingly, the HAL 106 enables device drivers to support a wide variety of input/output (I/O) architectures instead of either being restricted to a single hardware model or needing extensive adaptation for each new hardware platform.

The kernel 108 schedules activities for the computer system to perform. In the Windows NT operating system 100, the kernel 108 schedules the activities into threads. The kernel 108 dispatches threads in a way that ensures that the processor or processors of the computer system are always kept busy. The kernel 108 works closely with the HAL 106. Threads are defined in the context of a process which represents an address space, a set of objects visible to the process, and a set of threads that runs in the context of the process. Objects are resources that can be manipulated by the operating system.

The executive services system 102 includes the set of services including I/O manager 110, object manager 112, security reference monitor 114, process manager 116, local procedure call facility 118, and virtual memory manager 120. These services 110–120 are the interface between user-mode environment subsystems and the kernel 108. The I/O manager 110 manages all input and output for the Windows NT operating system 100. The object manager 112 provides uniform rules for retention, naming and security of objects. The security reference monitor 114 ensures that applications cannot access system resources without authorization. The process manager 116 manages the creation and deletion of processes. The local procedure call facility 118 manages local procedure calls (LPC) which involves message passing between applications and the environment subsystems. The virtual memory manager 120 manages the translation of virtual addresses to physical pages in memory.

FIG. 2 is a block diagram of the I/O manager 110 illustrated in FIG. 1. The I/O manager 110 includes, for example, a cache manager 200, file system drivers 202, network drivers 204 and device drivers 206. According to the Windows NT operating system 100, the architecture within the I/O manager 110 is layered so that separate drivers implement logically distinct layers of processing. For example, drivers in the lowest layer (device drivers 206) manipulate the physical devices of the computer system, while other drivers are then layered on top of the device drivers 206. The higher-level drivers 200, 202 and 204 pass logical I/O requests down to the device drivers 206 which in turn access the physical devices of the computer system on their behalf.

Additional details on the Windows NT operating system can, for example, be found in Microsoft Windows NT Resource Guide (for Windows NT workstation and Windows NT server version 3.51), Microsoft Press, 1995, which is hereby incorporated by reference.

Hardware vendors are able to customize their own HALs to provide functionality beyond what the Microsoft provided HAL provides. During installation, the Windows NT SETUP program determines which hardware platform is being configured and installs the appropriate customized HAL.

A major problem, however, is that a customized or enhanced HAL causes backwards compatibility problems. For example, if the HAL is modified such that it is enhanced to include additional entry points in a static fashion, then device drivers which make use of the additional entry points will likely cause the operating system to crash (with an unrecoverable error) if the HAL in use by the computer system does not have the additional entry points.

Thus, there is a need for techniques to extend the functionality provided by HALs, yet also provide backwards compatibility so that operating system crashes do not occur if the customized or enhanced HAL is not in use.

SUMMARY OF THE INVENTION

Broadly speaking, the invention is a technique for enhancing a software layer while ensuring backwards compatibility. In one implementation, the software layer is a hardware abstraction layer (HAL) that interfaces between hardware and an operating system of a computer system. The HAL can be enhanced with additional functionality without having to worry about crashing the operating system when the particular HAL in use with the computer system lacks the additional functionality. Hence, the inventive technique allows enhancements to the HAL to be made without causing any backwards compatible problems.

The invention can be implemented in numerous ways, including as a device, a system, a method, or a computer readable medium. Several embodiments of the invention are discussed below.

As an enhanced hardware abstraction layer (HAL) for an operating system of a computer system having hardware associated therewith, an embodiment of the invention includes a HAL identifier associated therewith, and executable function calls, the executable function calls being addressed by a plurality of fixed entry points and by at least one dynamic entry point.

As a system for providing enhancements to a hardware abstraction layer (HAL) of an operating system used with a computer having hardware, an embodiment of the invention includes: a HAL containing executable function calls, the executable function calls being addressed by a plurality of entry points; a device driver for accessing the hardware via the HAL; and a controller for controlling access to the hardware by the device driver through the HAL such that the device driver is prevented from calling the executable function calls within the HAL that are not present within the HAL.

As a method for performing function calls into a software layer interposed between device drivers and hardware of a computer system, an embodiment of the invention includes the operations of: searching a predetermined memory area for a signature associated with the software layer, comparing the signature identified by the searching operation with a particular signature for a particular enhanced software layer to produce a comparison result, and subsequently allowing at least one of the device drivers to make use of the comparison result when using the software layer. In addition, the invention may also obtain dynamic entry point addresses associated with the particular enhanced software layer when the comparing operation determines that the signature identified by the searching operation corresponds to the particular enhanced software layer.

As a computer-implemented method for accessing functional routines in a hardware abstraction layer (HAL) of a computer program, an embodiment of the invention includes the operations of: issuing a request for execution of one of the additional functional routines in the HAL; determining whether the HAL supports at least the one of the additional functional routines; and calling the one of the additional functional routines requested it is determined that the HAL supports at least the one of the additional functional routines.

As a computer readable medium containing program instructions for performing function calls into a software layer interposed between device drivers and hardware of a computer system, an embodiment of the invention includes: first computer readable code for searching a predetermined memory area for a signature associated with the software layer, second computer readable code for comparing the signature identified by the first computer readable code with a predetermined signature an enhanced software layer to produce a comparison result, and third computer readable code for storing the comparison result for subsequent use by at least one of the device drivers. Preferably, the computer readable medium also includes fourth computer readable code for obtaining dynamic entry point addresses associated with the enhanced software layer when the second computer readable code determines that the signature identified by the first computer readable code corresponds to the predetermined signature, and fifth computer readable code for thereafter processing function calls requested by the device drivers to the enhanced software layer to access the hardware using one or more of the dynamic entry point addresses when the comparison result indicated that the signature identified by the first computer readable code corresponds to the predetermined signature.

The advantages of the invention are numerous. One advantage of the invention is that additional entry points are easily added to the HAL without the potential for causing the operating system to crash in the case in which a HAL is loaded which does not support the additional entry points. The invention is also advantageous because multiple versions of device drivers would not be needed because the invention allows backwards compatibility as new entry points are added without affecting the old (standard) entry points or the device drivers which use them.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals design like structural elements, and in which.

DETAILED DESCRIPTION OF THE INVENTION

The invention pertains to a technique for enhancing a software layer while ensuring backwards compatibility. In one implementation, the software layer is a hardware abstraction layer (HAL) that interfaces between hardware and an operating system of a computer system. The HAL can be enhanced with additional functionality without having to worry about crashing the operating system when the particular HAL in use with the computer system lacks the additional functionality. Hence, the inventive technique allows enhancements to the HAL to be made without causing any backwards compatible problems.

The invention is described in detail below, but before describing the details of the invention, a conventional operating system and use of a hardware abstraction layer (HAL) are described.

Figure 1:
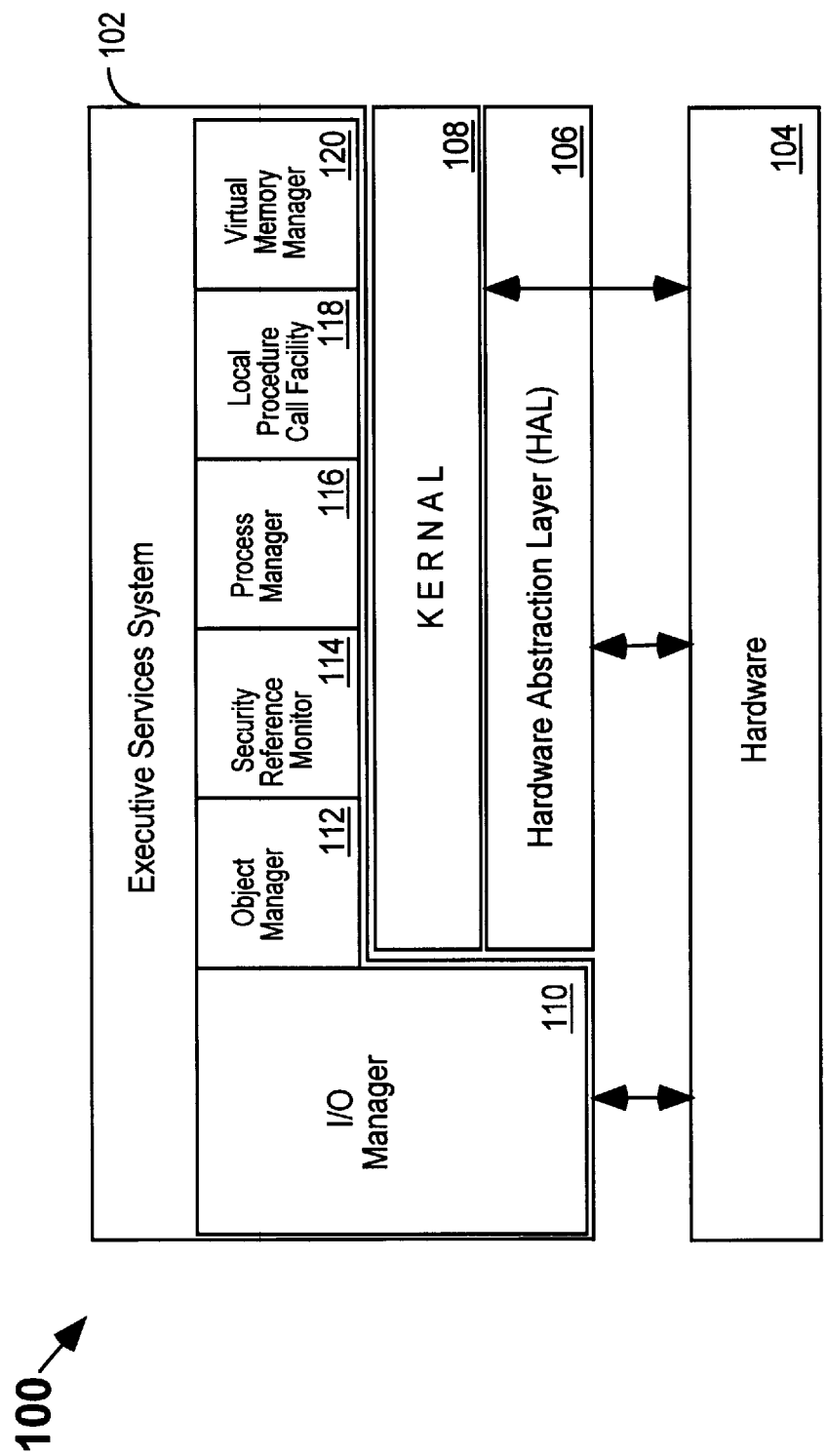
FIG. 1 is a block diagram of the architecture of Microsoft Windows NT.
Figure 2:
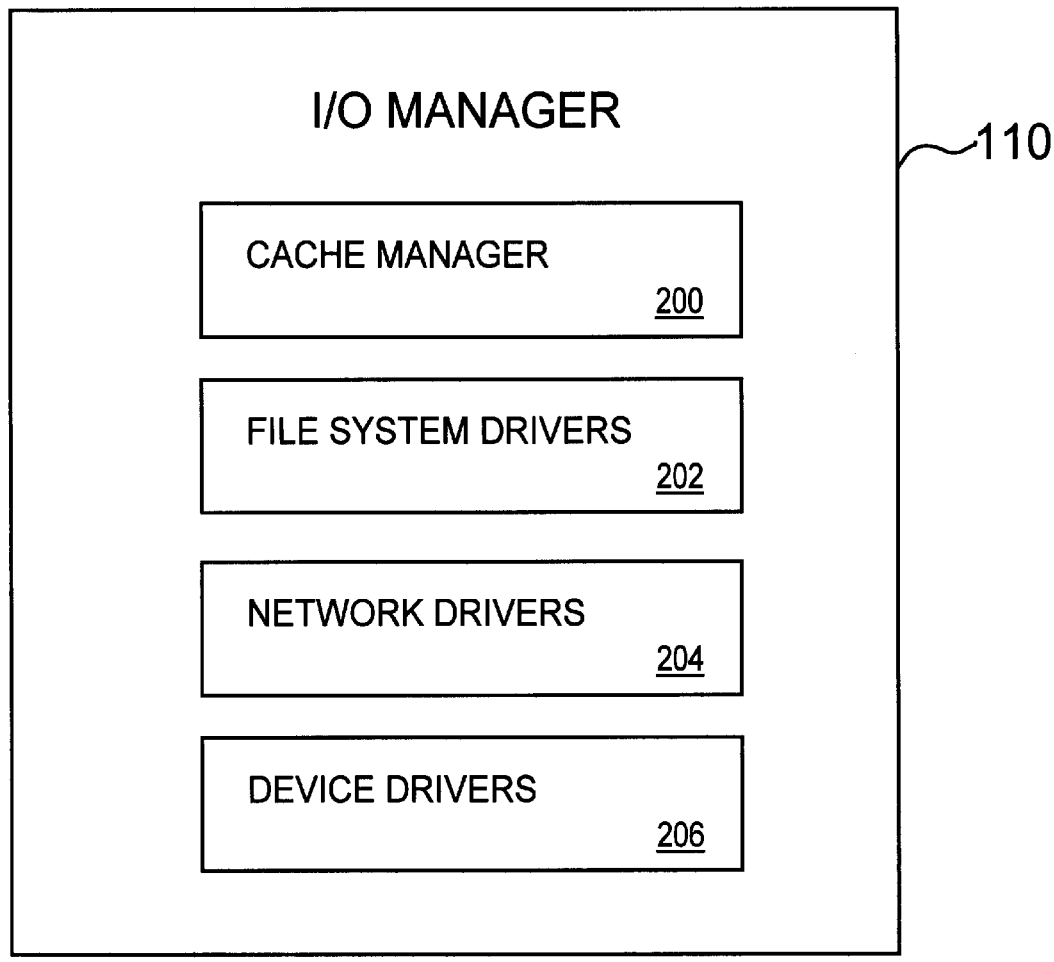
FIG. 2 is a block diagram of an I/O manager illustrated in FIG. 1.
Figure 3:
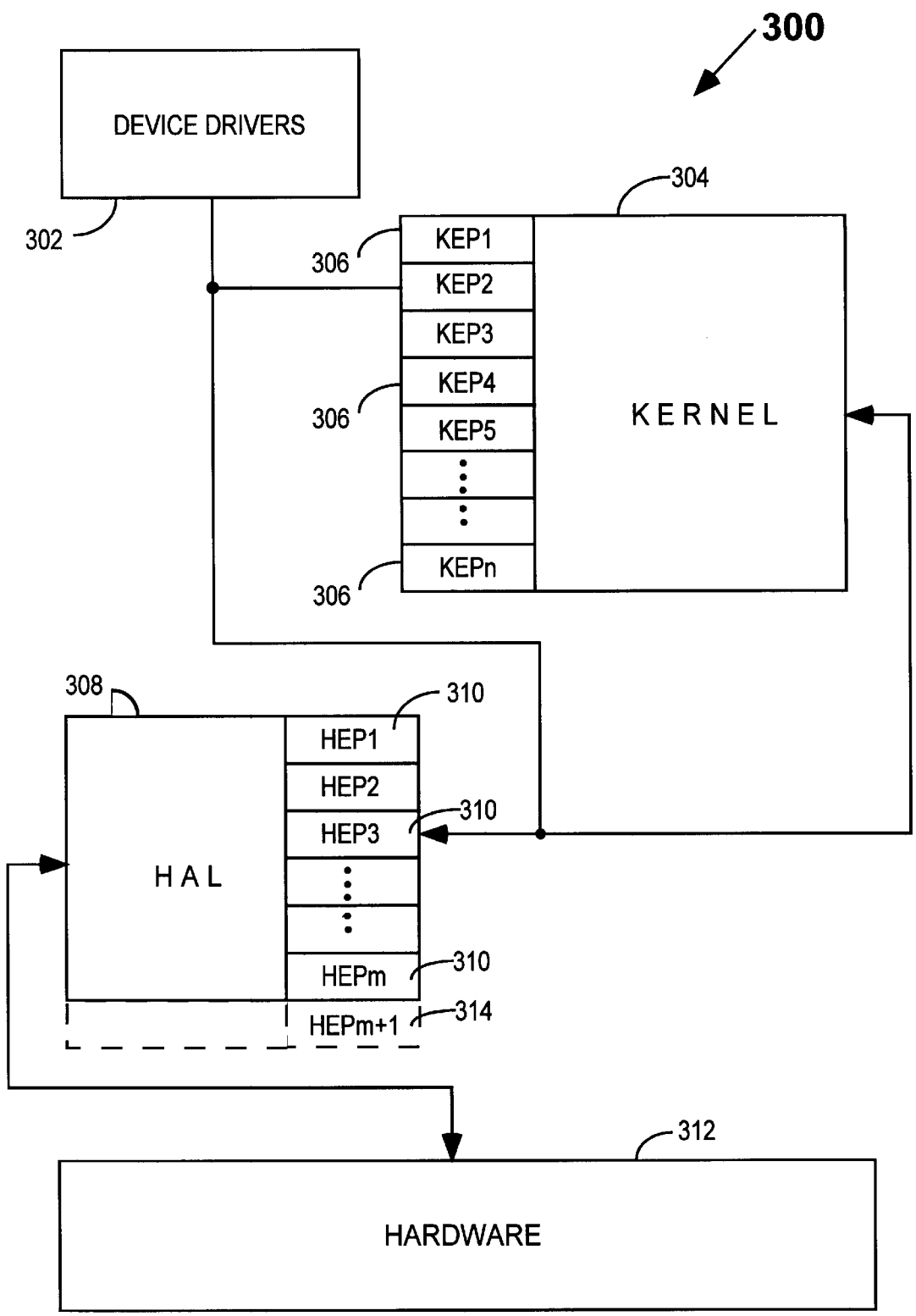
FIG. 3 is a diagram illustrating operation of a conventional operating system that is designed to make use of a hardware abstraction layer (HAL)

FIG. 3 is a diagram illustrating operation of a conventional operating system 300 that is designed to make use of a hardware abstraction layer (HAL). In particular, the diagram in FIG. 3 is representative of the operation of the Windows NT operating system.

Device drivers 302 interact with a kernel 304 through kernel entry points $KEP_1$–$KEP_n$ 306. The kernel entry points $KEP_1$–$KEP_n$ 306 are the first executable code addresses of function calls within the kernel 304. Hence, the device drivers 302 operate to identify the appropriate kernel entry point 306 which corresponds to the function call that the device driver 302 desires to execute. The device drivers 302 are then able to implement the function call by calling the function at the appropriate kernel entry point 306.

The device drivers 302 also call functions residing in the HAL 308. Here, the HAL 308 includes HAL entry points $HEP_1$–$HEP_m$ 310. The HAL entry points $HEP_1$–$HEP_m$ 310 are the first executable code addresses of function calls within the HAL 308. The HAL 308 then executes the function calls requested by the device drivers 302 and in so doing communicates with the hardware 312. Specifically, the HAL 308 is used to perform memory or I/O accesses to the hardware 312. The kernel 304 is also able to call functions residing in the HAL 308.

Consider an example in which the HAL 308 is extended (customized) to include an additional HAL entry point $HEP_{m+1}$ 314. The device drivers 302 calling into the HAL 308 could then utilize the additional entry point 314 if the functionality provided by the new function call associated with the additional entry point 314 were desired. However, if the device drivers 302 were to make a call to the additional entry point 314 and the HAL 308 in use by the computer system did not have the additional entry point 314 (e.g., the HAL is use was an older version), then the operating system would crash because the executable code for the intended function call is not present. Thus, although the improved functionality of enhanced HALs is desirable, adding additional fixed entry points to HALs in the above-described unprotected manner is not a satisfactory solution or approach because reliability and compatibility are compromised.

Embodiments of the invention are discussed below with reference to FIGS. 4–9. However, those skilled in the art will readily appreciate that the detailed description given herein with respect to these figures is for explanatory purposes as the invention extends beyond these limited embodiments.

Figure 4:
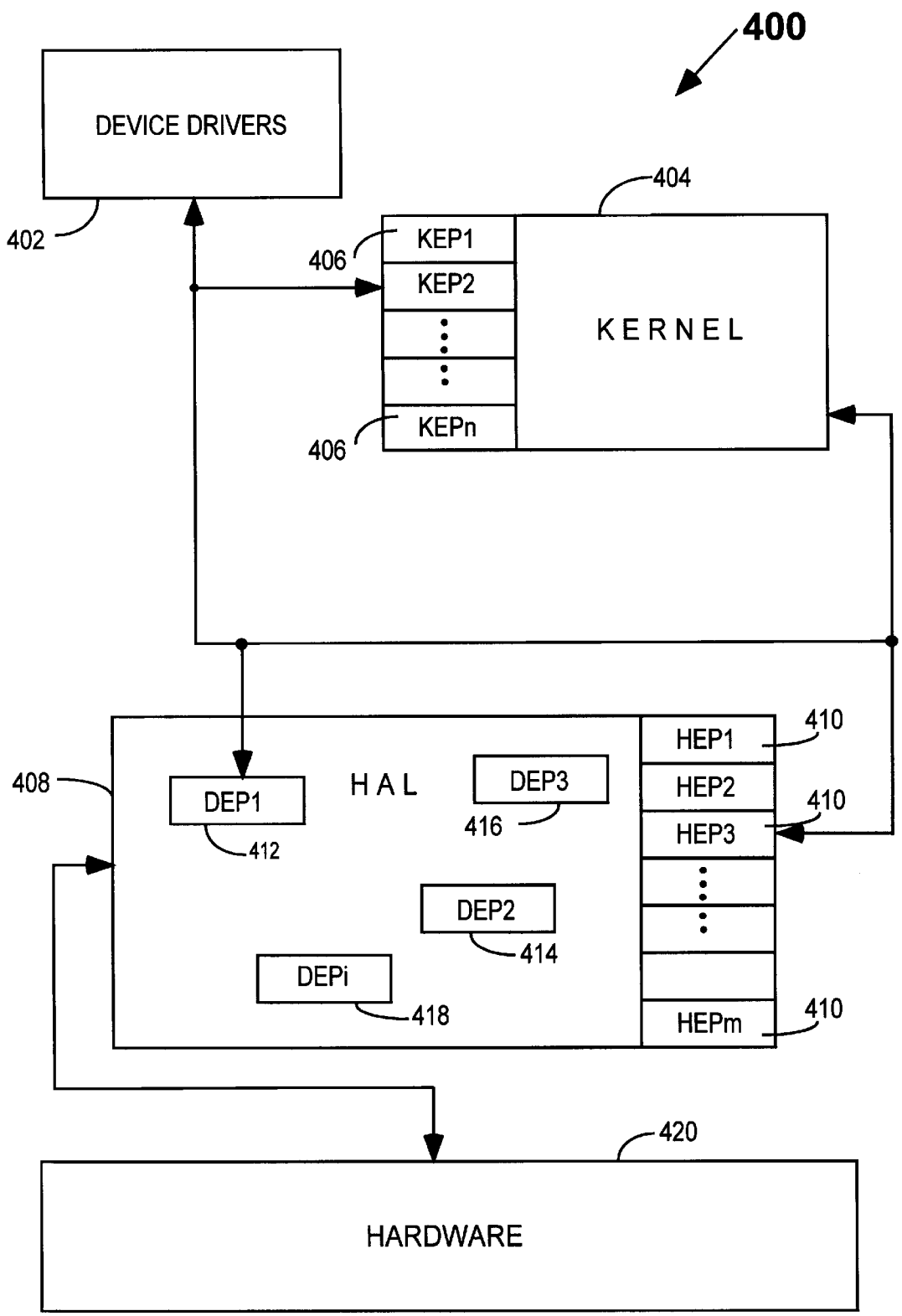
FIG. 4 is a diagram of an operating system in accordance with an embodiment of the invention.

FIG. 4 is a diagram of an operating system 400 in accordance with an embodiment of the invention. The operating system 400 includes device drivers 402, a kernel 404 having kernel entry points $KEP_1$–$KEP_n$ 406, and a hardware abstraction layer (HAL) 408. The HAL 408 includes HAL entry points (static entry points) $HEP_1$–$HEP_m$ 410, which are the first executable code addresses of function calls within the HAL 308. In addition, the HAL 408 includes dynamic entry points $DEP_1$ 412, $DEP_2$ 414, $DEP_3$ 416, . . . , $DE_i$ 418. The HAL 408 communicates with hardware 420 by way of memory access or I/O access.

The device drivers 402 (or the kernel 404) can access the HAL 408 using either the HAL entry points $HEP_1$–$HEP_m$ 410 or the dynamic entry points $DE_1$–$DEP_i$ 412–418. The HAL entry points $HEP_1$–$HEP_m$ 410 are static and fixed, whereas the dynamic entry points $DEP_1$–$DEP_i$ 412–18 are dynamic and therefore not fixed. More particularly, the dynamic entry points $DEP_1$–$DEP_i$ 412–418 differ from the HAL entry points $HEP_1$–$HEP_m$ 410 in that their location within the HAL 408 is not predetermined but could vary and, in addition, the number of dynamic entry points could vary depending on the particular HAL implementation. Consequently, the address within the HAL 408 for the dynamic entry points $DEP_1$–$DEP_i$ 412–418 are known by the HAL 408 but are not known by the device drivers 402 (or the kernel 404). Nevertheless, the techniques according to the invention described below with reference to FIGS. 5–9 enable the operating system 400 to determine and then use the addresses associated with the dynamic entry points $DEP_1$–$DEP_i$ 412–418 in a manner in which backwards compatibility is ensured.

Figure 5:
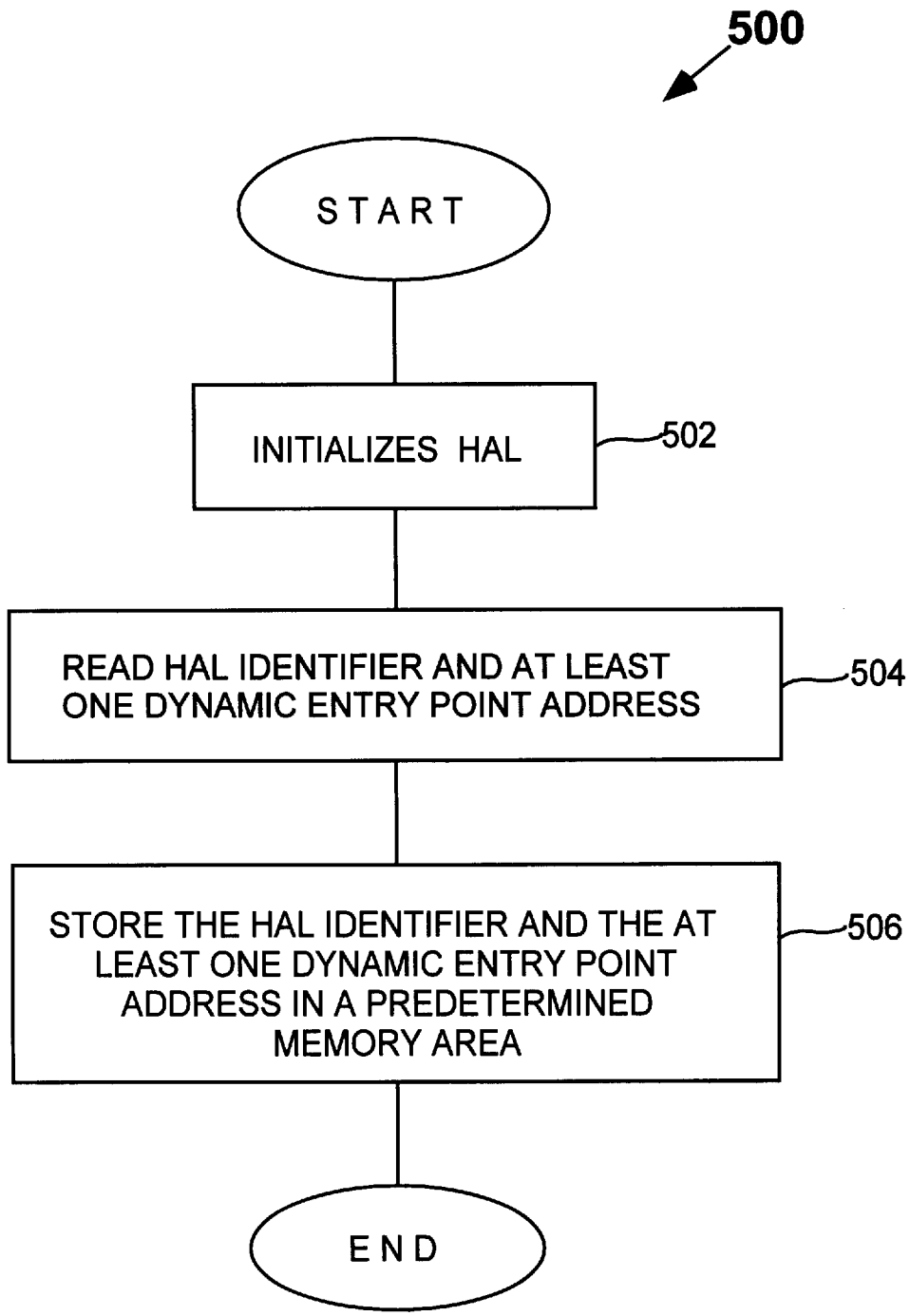
FIG. 5 is a flow diagram of HAL initialization processing according to an embodiment of the invention.

FIG. 5 is a flow diagram of HAL initialization processing 500 according to an embodiment of the invention. The HAL initialization processing 500 initializes 502 a hardware abstraction layer (HAL) of an operating system. The initialization 502 of the HAL is the same as conventionally performed. The initialization 502 of the HAL will typically initialize interrupt controllers, timers, DMA controllers, an active processor, and will start additional processors. After the HAL is initialized 502, a HAL identifier and at least one dynamic entry point address are read 504. In general, the HAL identifier can be a signature of a hardware vendor or an identifier of a specific HAL (e.g., version). The HAL identifier is preferably a hard-coded value within the HAL. The dynamic entry point addresses are preferably multi-byte addresses. Next, the HAL identifier and the at least one dynamic entry point address are stored 506 in a predetermined memory area. Preferably, the HAL identifier and the at least one dynamic entry point address are stored in a HAL processor control region (PCR) which is a memory area that is reserved specifically for the HAL of the Windows NT operating system. However, in other implementations, the storage can be performed in other areas of memory, including read-only-memory (ROM), disk, non-volatile random-access-memory (NVRAM), or CMOS devices. Following the storage 506, the HAL initialization processing 500 is complete and ends.

Figure 6:
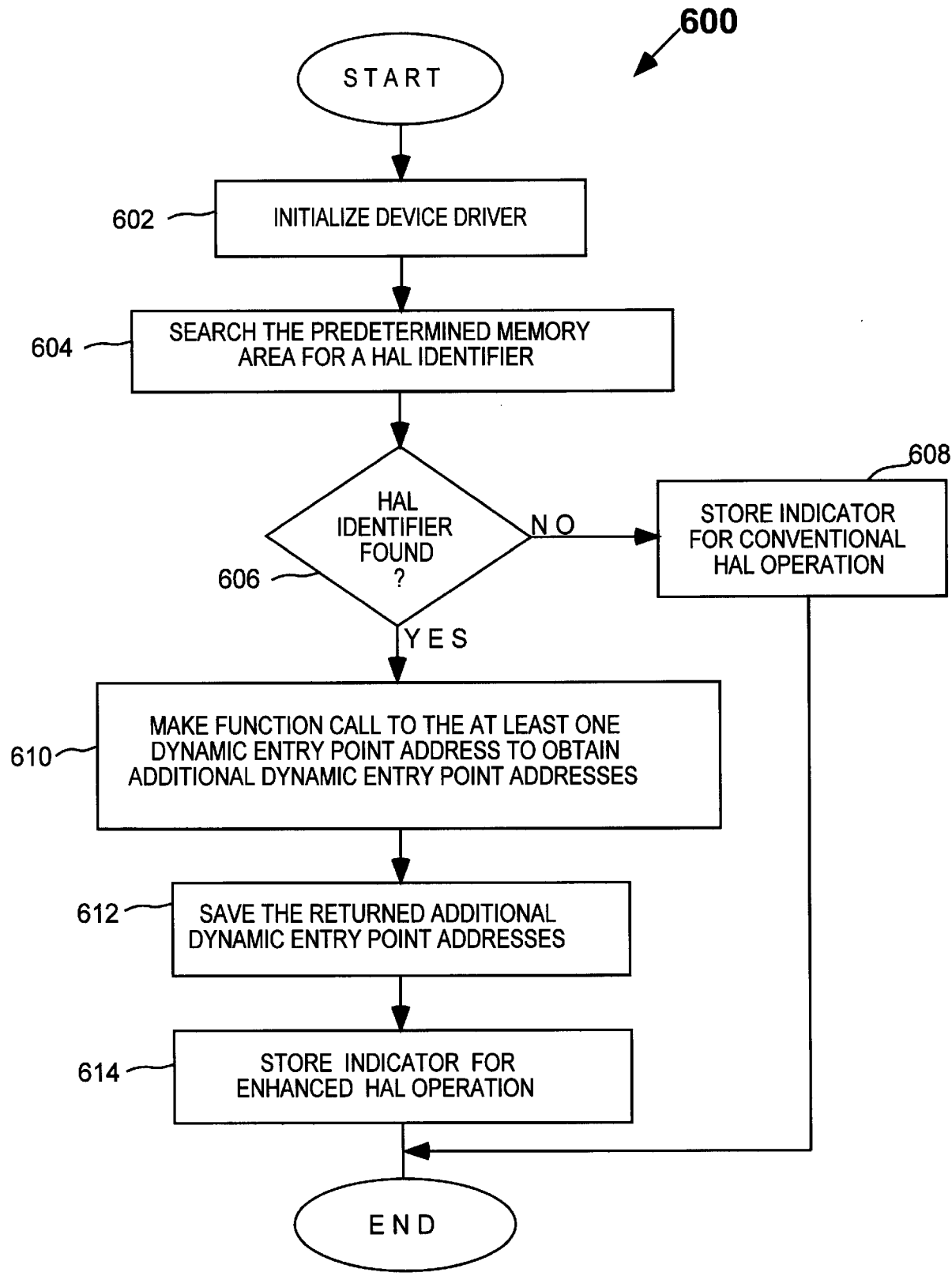
FIG. 6 is a flow diagram of device driver initialization processing according to an embodiment of the invention.

FIG. 6 is a flow diagram of device driver initialization processing 600 according to an embodiment of the invention. The device driver initialization processing 600 initializes 602 the device driver using conventional operations. After initializing 602 the device driver, the predetermined memory area is searched 604 for a HAL identifier. The predetermined memory area is the same storage region used to store 506 data during the HAL initialization processing 500. Next, a decision block 606 determines whether a HAL identifier was found. If a HAL identifier was not found during the searching 604, then the decision block 606 causes an indicator for conventional HAL operation to be stored 608. In this case, it is determined that the particular HAL being utilized in the operating system is not the HAL that the device prefers to utilize (i.e., the enhanced HAL). Hence, it is assumed that the conventional HAL is to be used as the default.

On the other hand, when the decision block 606 determines that the HAL identifier was found during the searching 604, then a function call to the at least one dynamic entry point address is made 610 to obtain additional dynamic entry point addresses. In this embodiment, the first dynamic entry point ($DEP_1$ 412) contains links or pointers to all of the other dynamic entry points (e.g., $DEP_2$–$DEP_i$). Hence, the device driver initialization processing 600 preferably makes 610 the function call to the address of the first dynamic entry point DEP 1 412 and thereby obtains the additional dynamic entry point addresses. The returned additional dynamic entry point addresses are then saved 612. Here, the returned additional dynamic entry point addresses are preferably stored in memory associated with the device drivers so that they can be later utilized as needed. Next, an indicator for enhanced HAL operation is stored 614. The indicator for the enhanced HAL operation serves to inform the device driver that the HAL in place supports enhanced HAL operations. Following block 614 or block 608, the device driver initialization processing 600 is complete and ends.

In the above-described embodiment of the device driver initialization processing 600, the HAL identifier is used to determine whether an enhanced HAL according to the invention is present. When the enhanced HAL is present (in place), the additional functionality of the enhanced HAL (as well as the default or standard functionality) can be utilized by the device drivers (via the dynamic entry points). But, when the HAL in place is not the enhanced HAL, only the default or standard functionality can be utilized by the device driver (via the static entry points).

Figure 7A:
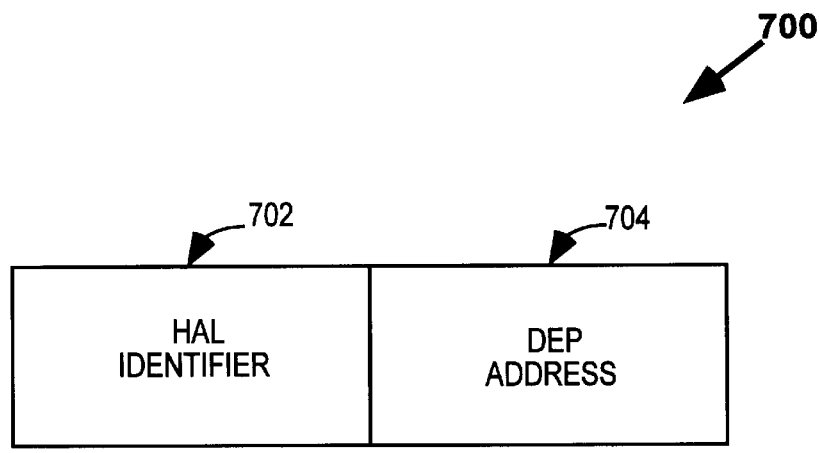
FIG. 7A is a diagram of a data structure including a HAL identifier and a dynamic entry point address.

FIG. 7A is a diagram of a data structure 700 including a HAL identifier 702 and a dynamic entry point address 704. The data structure 700 is the preferable structure for the processing illustrated in FIG. 5 and FIG. 6 in which the HAL identifier and at least one dynamic entry point address are stored in a predetermined memory area. Hence, the data structure 700 is stored to the predetermined memory area. Thereafter, if the HAL identifier 702 matches the HAL identifier searched for by the device driver during the initialization processing 600, the dynamic entry point address 704 associated with the HAL identifier 702 within the data structure 700 is the first dynamic entry point address which in turn is used (e.g., via a function call)to obtain the additional dynamic entry point addresses. If, on the other hand, the HAL identifier 702 does not match the HAL identifier searched for by the device driver during the initialization processing 600, then no additional dynamic entry point addresses would be available. Preferably, the HAL identifier 702 consists of four (4) bytes and the dynamic entry point address 704 consists of four (4) bytes. Thus, the memory storage requirement is minimal (e.g., only eight (8) bytes), which is particularly advantageous when the HAL PCR is used as the predetermined memory area because the HAL PCR only has storage space for sixty-four (64) bytes.

Figure 7B:
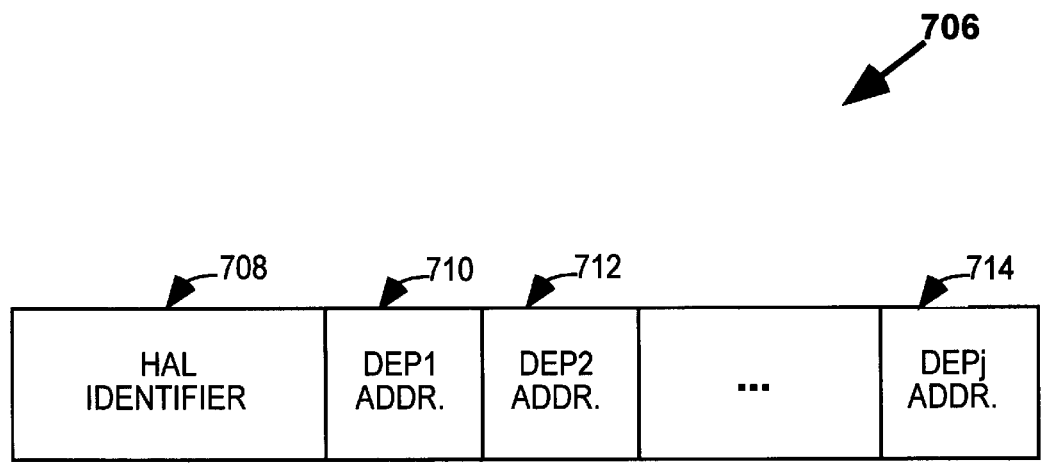
FIG. 7B is a diagram of a data structure for use with an alternative embodiment of the invention.

FIG. 7B illustrates a data structure 706 for an alternative embodiment of the invention. In this embodiment, the data structure 706 includes a HAL identifier 708 and a plurality of dynamic entry point addresses base $DEP_1$–$DEP_j$ 710–714. Hence, in this embodiment, if the HAL identifier 708 matches the HAL identifier searched for by the device driver during the device driver initialization processing 600, the various dynamic addresses sequentially follow the HAL identifier in the predetermined memory area. Hence, block 610 in FIG. 6 becomes unnecessary. This alternative embodiment is less desirable than the previous embodiment because it requires additional memory area to store the various dynamic entry addresses which are preferably four (4) bytes each.

Regardless of the data structure 700, 706, other information could also be provided within the data structure or obtained therefrom. The other information may include such information as version number, date, time, machine identifier, machine type, available buses and types, available hardware resources, hardware specific information, and/or software specific information.

Figure 8:
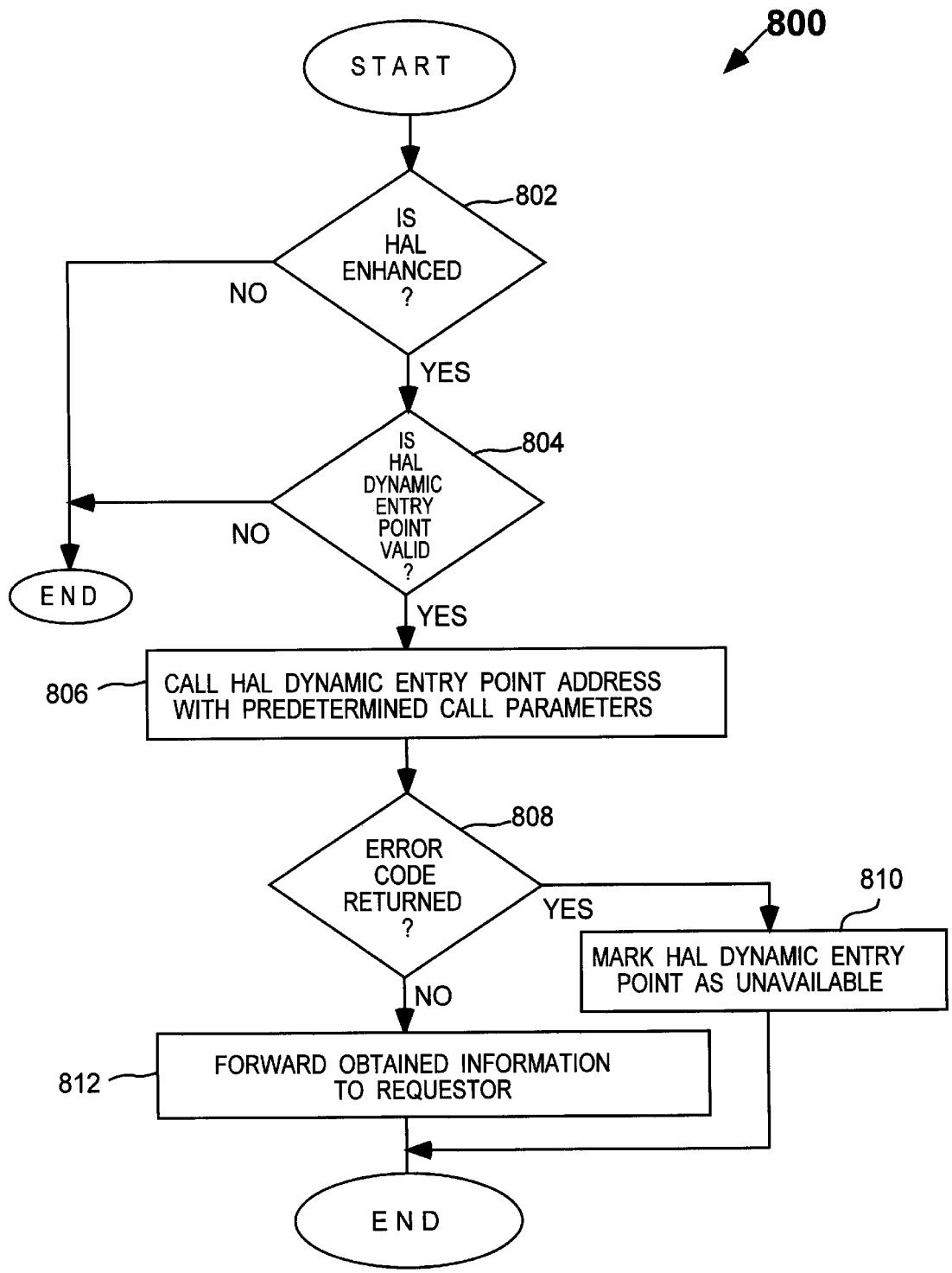
FIG. 8 is a flow diagram of hardware access request processing according to an embodiment of the invention.

FIG. 8 is a flow diagram of hardware access request processing 800 according to an embodiment of the invention. The hardware access request processing 800 is invoked whenever an access request is made to hardware through the dynamic entry points (DEPs) of the HAL. The access request is made by a requester. Normally, the requester is a device driver. Access requests using static entry points use conventional techniques which are not illustrated in FIG. 8.

The hardware access request processing 800 begins with a decision 802 that determines whether the HAL is an enhanced HAL. Here, a check is made to made ensure that the HAL in place supports dynamic entry points which are associated with an enhanced HAL. Specifically, it is determined whether the indicator set during the device driver initialization processing 600 (FIG. 6) indicates that the HAL in place supports the enhanced operations. If the HAL in place is not an enhanced HAL, then the hardware access request processing 800 ends because the HAL does not support the dynamic entry points.

On the other hand, if the HAL in place is an enhanced HAL, then the hardware access processing 800 continues because the HAL does support the dynamic entry points. Following block 802, a decision 804 determines whether a HAL dynamic entry point that the requester desires to call is valid for the HAL in place. This, for example, can be performed by checking whether the dynamic entry point address to be called is zero. If the dynamic entry point address is not equal to zero, then the particular dynamic entry point is supported and in which case the hardware access processing 800 continues. Alternatively, when the decision block 804 determines that the particular dynamic entry point is not valid (i.e., determines that the dynamic entry point address is equal to zero), then the hardware access request processing 800 ends because the HAL does not support the particular dynamic entry point.

Following the decision block 804 when the particular dynamic entry point is supported, a function call to the HAL dynamic entry point is performed 806. The function call includes predetermined call parameters for the function call to the HAL in place. Here, the function call to the HAL requested by the requester is performed. Next, a decision 808 determines whether an error code is returned by the function call.

When the error code is returned by the function call, the HAL in place for some reason does not properly execute the function call that is supposed to be supported. One reason for an error code to be returned is that a hardware device is malfunctioning. In this case, the particular HAL dynamic entry point is marked 810 as being unavailable because it has returned an error code. In this embodiment, the marking 810 is achieved by setting the particular dynamic entry point address to zero. Once marked 810 as unavailable, subsequent function calls to the particular dynamic entry point are prevented by the decision block 804.

On the other hand, when an error code is not returned by the function call, then the function call has executed properly. In this case, the information obtained from the function call is forwarded 812 to the requester. Here, the enhancements to the HAL are being taken advantage of by the requester. The information obtained from the function call can pertain to many different things. A few examples of the information obtained are: performance statistics for performance monitoring, a list of HAL fixes supported by a driver, etc. In other implementations, the information obtained is merely notification of a completed task. The function calls associated with the dynamic entry points can perform any of a number of tasks. One example is that the function call could issue a software systems management interrupt. Another example is that the function call could replace code in memory (e.g., place an improved interrupt service routine into an interrupt dispatch table).

In any event, following either blocks 810 or 812 the hardware access request processing 800 is complete and ends.

The invention employs various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. An exemplary structure for the invention is described below.

Figure 9:
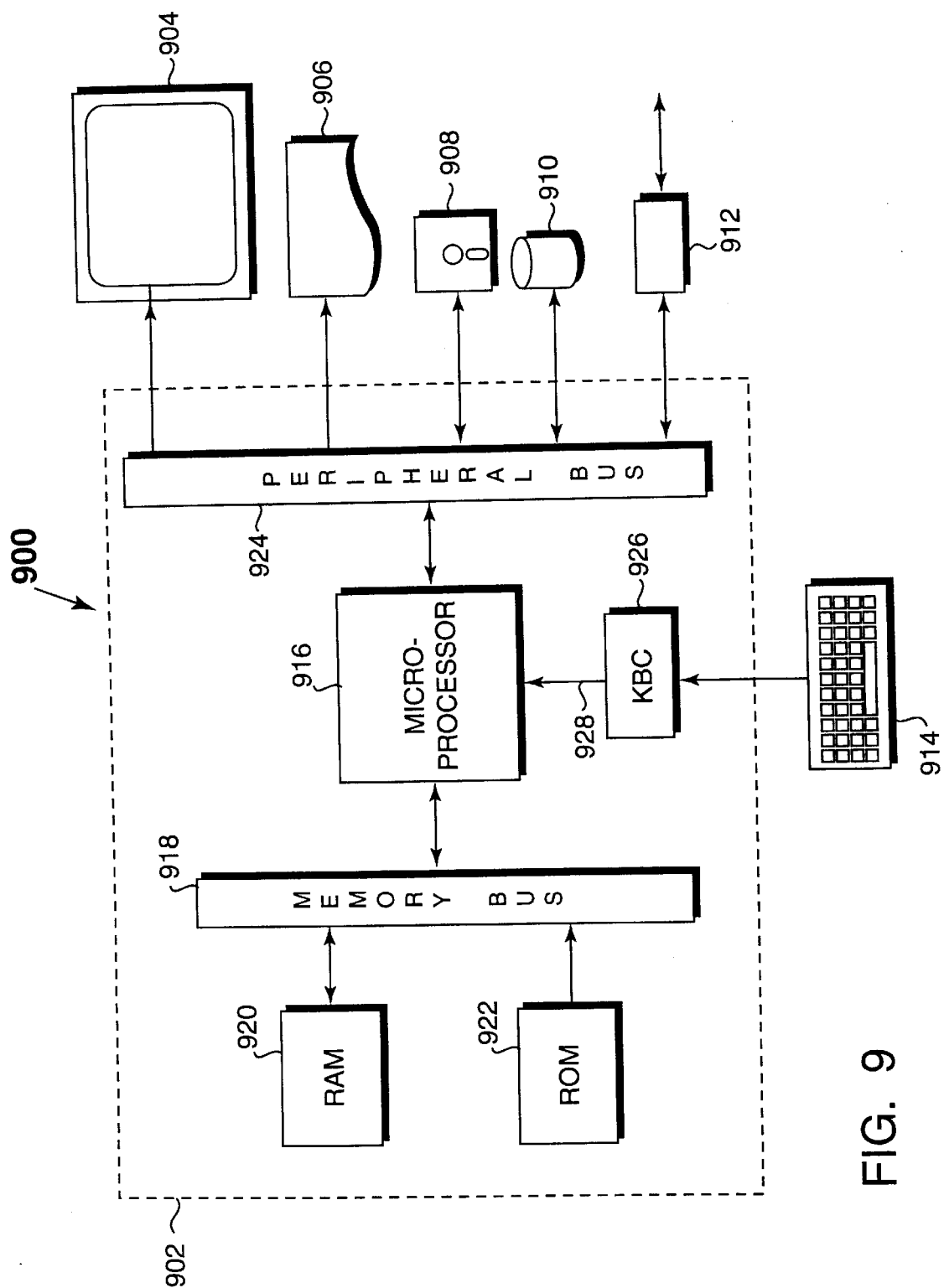
FIG. 9 is a block diagram of an exemplary computer system for carrying out the processing according to the invention.

FIG. 9 is a block diagram of an exemplary computer system 900 for carrying out the processing according to the invention. The computer system 900 includes a digital computer 902, a display screen (or monitor) 904, a printer 906, a floppy disk drive 908, a hard disk drive 910, a network interface 912, and a keyboard 914. The digital computer 902 includes a microprocessor 916, a memory bus 918, random access memory (RAM) 920, read only memory (ROM) 922, a peripheral bus 924, and a keyboard controller 926. The digital computer 900 can be a personal computer (such as an IBM compatible personal computer), a workstation computer (such as a S un Microsystems or Hewlett-Packard workstation), or some other type of computer.

The microprocessor 916 is a general purpose digital processor which controls the operation of the computer system 900. The microprocessor 916 can be a single-chip processor or can be implemented with multiple components. Using instructions retrieved from memory, the microprocessor 916 controls the reception and manipulation of input data and the output and display of data on output devices. According to the invention, a particular function of microprocessor 916 is to perform accesses to a software layer (e.g., HAL)in a way that is backwards compatible.

The memory bus 918 is used by the microprocessor 916 to access the RAM 920 and the ROM 922. The RAM 920 is used by the microprocessor 916 as a general storage area and as scratch-pad memory, and can also be used to store input data and processed data. The ROM 922 can be used to store instructions or program code followed by the microprocessor 916 as well as other data.

The peripheral bus 924 is used to access the input, output, and storage devices used by the digital computer 902. In the described embodiment, these devices include the display screen 904, the printer device 906, the floppy disk drive 908, the hard disk drive 910, and the network interface 912. The keyboard controller 926 is used to receive input from keyboard 914 and send decoded symbols for each pressed key to microprocessor 916 over bus 928.

The display screen 904 is an output device that displays images of data provided by the microprocessor 916 via the peripheral bus 924 or provided by other components in the computer system 900. The printer device 906 when operating as a printer provides an image on a sheet of paper or a similar surface. Other output devices such as a plotter, typesetter, etc. can be used in place of, or in addition to, the printer device 906.

The floppy disk drive 908 and the hard disk drive 910 can be used to store various types of data. The floppy disk drive 908 facilitates transporting such data to other computer systems, and hard disk drive 910 permits fast access to large amounts of stored data.

The microprocessor 916 together with an operating system operate to execute computer code and produce and use data. The computer code and data may reside on the RAM 920, the ROM 922, or the hard disk drive 920. The computer code and data could also reside on a removable program medium and loaded or installed onto the computer system 900 when needed. Removable program mediums include, for example, CD-ROM, PC-CARD, floppy disk and magnetic tape. The operating system preferably includes the software layer (e.g., HAL) which interfaces between the hardware and higher layers of the operating system. When device drivers want to communicate with the hardware (e.g., display 904, printer 906, drives 908 and 910) they do so by function calls to the software layer.

The network interface 912 is used to send and receive data over a network connected to other computer systems. An interface card or similar device and appropriate software implemented by the microprocessor 916 can be used to connect the computer system 900 to an existing network and transfer data according to standard protocols.

The keyboard 914 is used by a user to input commands and other instructions to the computer system 900. Other types of user input devices can also be used in conjunction with the present invention. For example, pointing devices such as a computer mouse, a track ball, a stylus, or a tablet can be used to manipulate a pointer on a screen of a general-purpose computer.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

The advantages of the invention are numerous. One advantage of the invention is that additional entry points are easily added to the HAL without the potential for causing the operating system to crash in the case in which a HAL is loaded which does not support the additional entry points. For example, when Windows NT loads kernel mode device drivers it will crash the system (intentionally) if a kernel mode device driver has a NT style entry point defined that cannot be resolved in any of the loaded software. The invention is also advantageous because multiple versions of device drivers would not be needed because the invention allows backwards compatibility as new entry points are added without affecting the old (standard) entry points or the device drivers which use them.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A system as for providing enhancements to a hardware abstraction layer (HAL) of an operating system used with a computer having hardware, and said system comprising:

a HAL containing executable function calls and a HAL identifier, the executable function calls being addressed by a plurality of entry points, and the plurality of entry points includes a plurality of fixed entry points and a plurality of dynamic entry points;

a data storage region for storing at least the HAL identifier and at least one of the dynamic entry points;

a device driver for accessing the hardware via said HAL, said device driver selects a particular HAL identifier; and a controller for controlling access to the hardware by said device driver through said HAL, said controller permits access to the hardware by said device driver through the fixed entry points and the dynamic entry points, and said controller determines whether the particular HAL identifier matches the HAL identifier stored in said data storage region, makes function calls to said HAL using either of the fixed entry points or the dynamic entry points when the particular HAL identifier matches the HAL identifier stored in said data storage region, and makes function calls to said HAL using only the fixed entry point addresses when the particular HAL identifier does not match the HAL identifier stored in said data storage region, thereby said device driver is prevented from calling the executable function calls that are not present within said HAL.

2. A system for providing enhancements to a hardware abstraction layer (HAL) of an operating system used with a computer having hardware, and said system comprising:

a HAL containing a HAL identifier and executable function calls, the executable function calls being addressed by a plurality of entry points, and the plurality of entry points within said HAL include a plurality of fixed entry points and a plurality of dynamic entry points;

a device driver for accessing the hardware via said HAL; and a controller for controlling access to the hardware by said device driver through the fixed entry points and the dynamic entry points of said HAL such that said device driver is prevented from calling at least one of the executable function calls within said HAL that are not present within said HAL, wherein said device driver requests a particular HAL using a particular HAL identifier, and wherein said controller comprises:
  computer code devices for reading the HAL identifier and the at least one dynamic entry point address from said HAL;
  computer code devices for storing the HAL identifier and the at least one dynamic entry point address to said data storage region;
  computer code devices for obtaining the HAL identifier, if any, stored in said data storage region;
  computer code devices for comparing the HAL identifier obtained with the particular HAL identifier with the particular HAL identifier; and
  computer code devices for operating said HAL without the enhancements with the HAL identifier obtained does not match the particular HAL identifier and for operating said HAL with the enhancements when the HAL identifier obtained does match the particular HAL identifier.

3. A system as recited in claim 2, wherein said controller further comprises:
  computer code devices for identifying the dynamic entry point addresses in said HAL when the HAL identifier obtained matches the particular HAL identifier.

4. A method for performing function calls into a software layer interposed between device drivers and hardware of a computer system, said method comprising:
  (a) searching a predetermined memory area to identify a signature associated with the software layer;
  (b) comparing the signature identified with a particular signature for a particular enhanced software layer to produce a comparison result;
  (c) determining whether the particular enhanced software layer is present based on the comparison result;
  (d) obtaining dynamic entry point addresses associated with the particular enhanced software layer when the particular enhanced software layer is determined to be present; and
  (e) thereafter processing function calls using the dynamic entry point addresses to the particular enhanced software layer as requested by the device drivers so as to access the hardware.

5. A method as recited in claim 4, wherein the dynamic entry point addresses are stored in the predetermined memory area.

6. A method as recited in claim 4, wherein the dynamic entry point addresses are stored in the predetermined memory area contiguous with the signature.

7. A method as recited in claim 4, wherein a first dynamic entry point address is stored in the predetermined memory area in relation to the signature, and the remaining dynamic entry point addresses for the particular enhanced software layer are obtained from the first dynamic entry point.

8. A method as recited in claim 4, wherein the particular enhanced software layer is a hardware abstraction layer (HAL).

9. A method as recited in claim 7, wherein the remaining dynamic entry point addresses for the particular enhanced software layer are determined by a function call to the first dynamic entry point address.

10. A computer-implemented method for accessing additional functional routines in a hardware abstraction layer (HAL) of a computer program, said method comprising:
  (a) issuing a request for execution of one of the additional functional routines in the HAL;
  (b) determining whether the HAL supports at least the one of the additional functional routines, said determining (b) including the operations of searching a predetermined area for a signature associated with the HAL, comparing the signature identified by said searching with a predetermined signature associated with a HAL that supports at least the one of the functional routines, and determining whether the HAL supports at least the one of the functional routines based on said comparing; and
  (c) executing the one of the additional functional routines requested when said determining (b) determines that the HAL supports at least the one of the additional functional routines, and prevent executing the one of the additional functional routines requested when said determining (b) determines that the HAL does not support at least the one of the additional functional routines.

11. A computer-implemented method as recited in claim 10 wherein said method further comprises:
  (d) previously determining dynamic entry points for the additional functional routines that are supported by the HAL, and wherein said executing (c) calls the one of the additional functional routines using one of the dynamic entry points.

12. A computer readable medium containing program instructions for performing function calls into a software layer interposed between device drivers and hardware of a computer system, said computer readable medium comprising:

first computer readable code for searching a predetermined memory area to identify a signature associated with the software layer;

second computer readable code for comparing the signature identified by said first computer readable code with a predetermined signature for an enhanced software layer to produce a comparison result;

third computer readable code for determining whether the particular enhanced software layer is present and available for subsequent use by at least one of the device drivers based on the comparison result;

fourth computer readable code for obtaining dynamic entry point addresses associated with the particular enhanced software layer when the particular enhanced software layer is determined to be present; and fifth computer readable code for thereafter processing function calls using at least one of the dynamic entry point addresses to the particular enhanced software layer as requested by the device drivers so as to access the hardware.

13. A computer readable medium as recited in claim 12, wherein the dynamic entry point addresses are stored in the predetermined memory area.

14. A computer readable medium as recited in claim 12, wherein the dynamic entry point addresses are stored in the predetermined memory area contiguous with the signature.

15. A computer readable medium as recited in claim 12, wherein a first dynamic entry point address is stored i the predetermined memory area in relation to the signature, and the remaining dynamic entry point addresses for the particular enhanced software layer are obtained sing the first dynamic entry point.

16. A computer readble medium as recited in claim 15, wherein the remaining dynamic entry point addresses for the particular enhanced software layer are determined by a function call to the first dynamic entry point address.

17. A system for providing enhancements to a hardware abstraction layer (HAL) of an operating system used with a computer having hardware, and said system comprising:

a HAL containing executable function calls, the executable function calls being addressed by a plurality of entry points, the plurality of entry points within said HAL include a plurality of fixed entry points and a plurality of dynamic entry points, and said HAL includes a data structure that includes a HAL identifier associated with said HAL and a location for at least a first of the dynamic entry points for said HAL;

a device driver for accessing the hardware via said HAL; and a controller for controlling access to the hardware by said device driver through said HAL such that said device driver is prevented from calling the executable function calls within said HAL that are not present within said HAL, said controller permits access to the hardware by said device driver through the fixed entry points and permits access to the hardware by said device driver through the dynamic entry points.

18. A system as recited in claim 17, wherein locations for the remaining dynamic entry points for said HAL are obtained using the location for the first of the dynamic entry points.

\* \* \* \* \*